June 15, 1965  H. G. LUEDERS  3,188,811
SELF GOVERNING POWER PLANT
Filed Sept. 15, 1961  2 Sheets-Sheet 1

INVENTOR.
Howard G. Lueders
BY
C. W. Christen
ATTORNEY

June 15, 1965   H. G. LUEDERS   3,188,811
SELF GOVERNING POWER PLANT
Filed Sept. 15, 1961   2 Sheets-Sheet 2

INVENTOR.
Howard G. Lueders
BY
ATTORNEY

United States Patent Office 3,188,811
Patented June 15, 1965

3,188,811
SELF GOVERNING POWER PLANT
Howard G. Lueders, Indianapolis, Ind., assignor to General Motors Corporation, Detroit, Mich., a corporation of Delaware
Filed Sept. 15, 1961, Ser. No. 138,381
5 Claims. (Cl. 60—57)

This invention relates to self governing power plants, and more particularly to a compressor-turbine unit which is adapted to drive a variable load accessory within an acceptable speed range.

There are many instances where it is desirable to drive an accessory by an air turbine within a limited speed range even though the load of the accessory and the energy level of the ram air for the turbine be variable. The conventional manner of controlling the air turbine speed is to throttle the ram air of the turbine inlet in accordance with a speed governor setting.

The primary object of the invention is to increase the reliability of the air turbine power plant by eliminating the throttle and the associated governor.

In carrying the invention into effect, the turbine is shaft connected with a compressor and an accessory that has a much lower power rating than the turbine. The compressor and turbine have a common air inlet and each discharge through choked orifices.

Other objects and advantages of the invention will be apparent from the following description, reference being had to the accompanying drawings wherein a preferred form of the invention is clearly shown.

Figure 1:
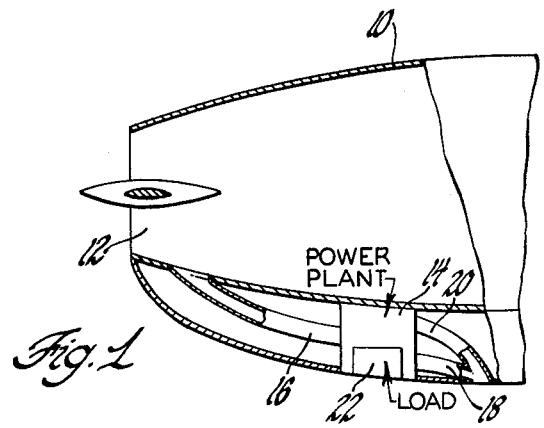
FIGURE 1 is a schematic view of an air missile utilizing the self governing power plant of the invention.

Referring to FIGURE 1, a missile 10 has a ram air inlet 12 and a power plant 14 which is supplied with air under many atmospheres of pressure during flight by an air inlet 16. The power plant 14 discharges to ambient air through choked orifice passages 18 and 20. The power plant 14 drives a load 22 which could, for example, be an alternator which requires its speed to be maintained within certain limits under load and no-load conditions.

Figure 2:
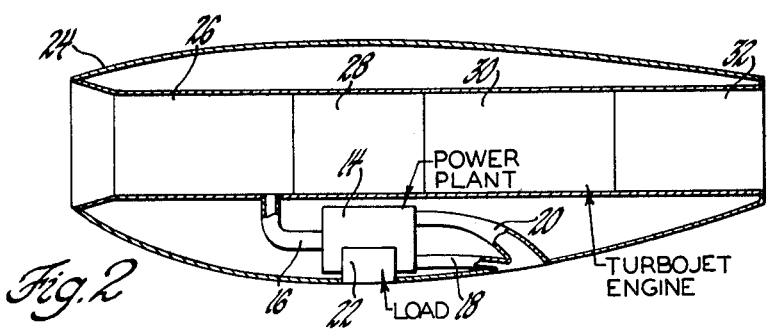
FIGURE 2 is a schematic view of a turbojet engine incorporating the power plant.

The arrangement shown in FIGURE 2 includes a nacelle 24 which houses a turbojet engine having the usual compressor portion 26, combustor portion 28, turbine portion 30 and exhaust nozzle portion 32. The power supply 14 in this instance draws highly compressed air from the compressor 26 by way of the air inlet 16 and discharges to ambient air through the choked orifice passages 18 and 20. In this case, the load 22 could be an afterburner fuel pump or similar accessory where speed regulation is required under various load conditions.

Figure 3:
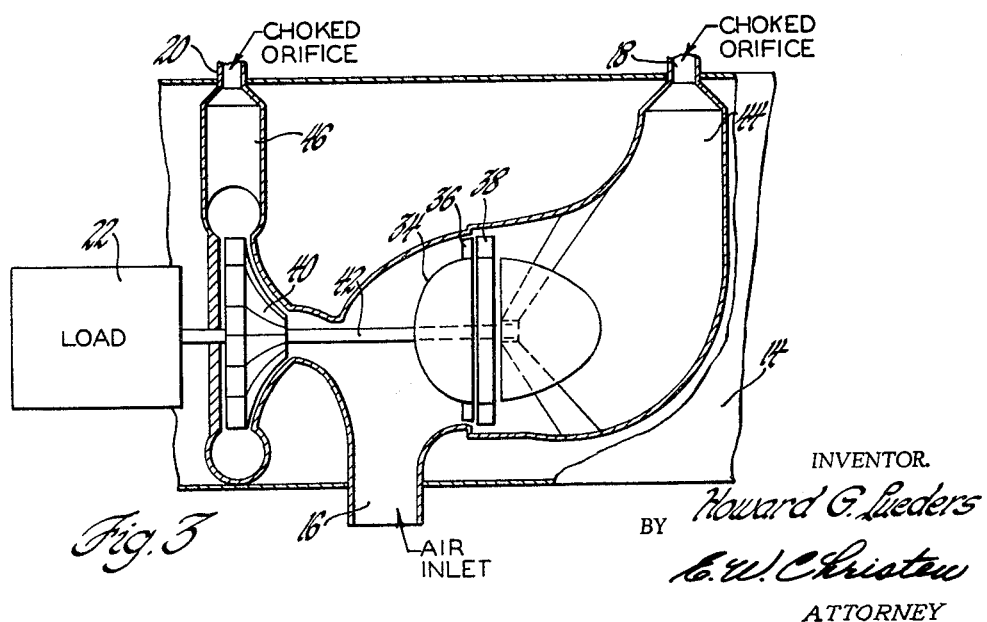
FIGURE 3 is a schematic section of the power plant.

Referring to FIGURE 3 it is seen that the air inlet 16 supplies an axial air turbine 34, which includes the usual stator vanes 36 and turbine wheel 38, and also supplies a centrifugal air compressor 40. The turbine 34 drives the compressor 40 and the load 22 through a shaft 42. The exhaust passage 44 of the turbine leads to the choked orifice 18 for discharge to ambient air while the exhaust passage 46 of the compressor 40 leads to the choked orifice 20 for discharge to ambient air.

In order that the load 22 may be driven within a satisfactory speed range despite changes in load, air inlet conditions and ambient air conditions, two basic requirements must be met. The first requirement is that there be a sufficient pressure ratio (total pressure of the ram air over the ambient air) to drive the turbine and compressor with the downstream orifices 18 and 20 in choked condition. With this requirement met, it is seen that changes in ambient air pressure downstream of the choked orifices can have no effect upon the speed or output of the power plant 14. The second requirement is that the power rating of the turbine 34 be much greater than the power requirement of the load 22 and it should be noted that with increasingly greater disparity between the horsepower ratings there will be a decreasing range of speed variation.

Figure 4:
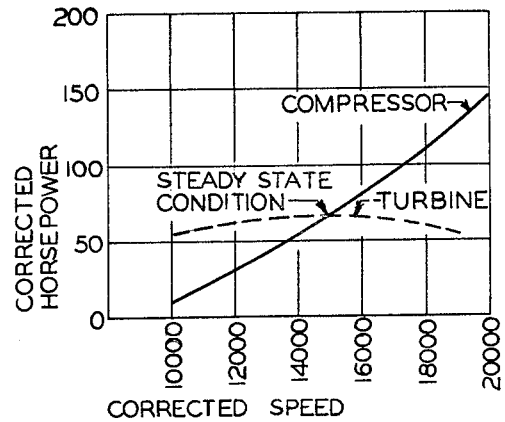
FIGURE 4 is a corrected horsepower and speed characteristic curve diagram of the compressor and turbine without accessory load.
Figure 5:
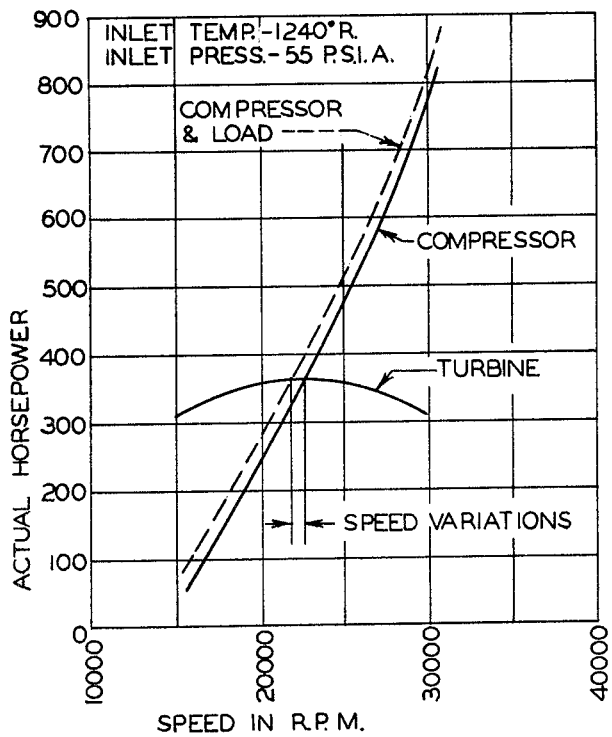
FIGURE 5 is a diagram of actual speed and horsepower curves of the compressor and turbine under load and no-load conditions and at a certain air inlet temperature and pressure.

The inherently self governing action of the power plant is more apparent on reference to FIGURES 4 and 5. FIGURE 4 shows corrected horsepower and corrected speed characteristic curves for the turbine and compressor without accessory load. With the turbine orifice 18 choked, the turbine curve represents the corrected horsepower output at constant turbine expansion ratio as a function of corrected speed. Similarly, with the compressor orifice 20 choked, the compressor curve represents the corrected horsepower required to drive the compressor as a function of its corrected speed. Since the turbine and compressor are mechanically connected by the shaft 42 and since they share the common air inlet 16, it is possible to superimpose the characteristic curves of both components and the point of intersection represents the corrected speed at which they operate. Since the turbine-compressor unit will always operate at the same corrected speed, it is evident that the unit's mechanical speed, assuming zero accessory load, will only vary as a function of the square root of the total air inlet temperature.

Viewed another way, FIGURE 4 represents the compressor as absorbing the full power output of the turbine under corrected conditions. As long as both orifices run choked, a variation in ambient discharge pressure will not affect the mechanical speed of the unit. Moreover, with the discharge orifices running choked, a change in air inlet pressure will not affect the mechanical speed of the unit inasmuch as both components share the same inlet whereby the power requirement of the compressor will follow the power output of the turbine. A change in air inlet temperature will, of course, affect the speed somewhat as the turbine output is a function of the air intake total temperature. However, the speed variation due to air inlet temperature changes is acceptable. For example, a change in inlet temperature from 1240 degrees to 1510 degrees Rankine will bring about a total speed variation in the neighborhood of 10 percent.

Referring now to FIGURE 5, the actual characteristic curves of the components at load and no-load are presented where the air inlet temperature is 1240 degrees Rankine and the air inlet pressure is 55 pounds per square inch absolute. From the diagram it is seen that there is about a five percent speed variation between load and no-load conditions. In this instance, the accessory load is 30 horsepower and the compressor and load curve represents a 30 horsepower addition to the compressor curve. The actual horsepower of the turbine under the specific inlet conditions is about 360. Now, were the same unit to be run at a greatly increased inlet pressure or temperature, the speed variation would decrease considerably because the 30 horsepower load range would not change and would have a lesser effect on the resultant higher horsepower unit.

It should be pointed out that FIGURE 5 only represents the characteristic curves at one inlet condition and that other curves of a similar nature will represent other inlet conditions. It was pointed out in connection with FIGURE 4 concerning no-load conditions that an increase in inlet temperature would result in an increase in mechanical speed. This mechanical speed increase with inlet temperature increase will also occur under load conditions. It was also pointed out that under no-load conditions there would be no change in mechanical speed due to an increase in inlet pressure. This does not follow for load conditions and in this instance there is a slight increase in mechanical speed with an increase in inlet pressure.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A fluid motor having a substantially constant speed over an appreciable range of power output comprising, in combination, a first turbomachine adapted to convert fluid pressure energy into mechanical energy, a second turbomachine adapted to convert mechanical energy into fluid pressure energy, means connecting the first turbomachine to drive the second turbomachine, a power absorbing useful work device driven by the first turbomachine and having an energy demand relatively low compared to the second turbomachine, the second turbomachine being adapted to absorb the major part of the energy output of the first turbomachine at a speed of the turbomachines affording the maximum energy output of the first turbomachine, a common source of fluid under substantial pressure connected to supply fluid directly to the inlets of both turbomachines, and means to exhaust both turbomachines through outlets of fixed resistance to flow to a low pressure exhaust level substantially below that of the source so that the ratio of the flows through the two turbomachines is not significantly affected by variations in the exhaust level.

2. A fluid motor having a substantially constant speed over an appreciable range of power output comprising, in combination, a first turbomachine adapted to convert fluid pressure energy into mechanical energy, a second turbomachine adapted to convert mechanical energy into fluid pressure energy, means connecting the first turbomachine to drive the second turbomachine, a power absorbing useful work deveice driven by the first turbomachine and having an energy demand relatively low compared to the second turbomachine, the second turbomachine being adapted to absorb the major part of the energy output of the first turbomachine at a speed of the turbomachines affording the maximum energy output of the first turbomachine, a common source of fluid under substantial pressure connected to supply fluid directly to the inlets of both turbomachines, and means to exhaust both turbomachines to a low pressure level substantially below that of the source, the last-mentioned means comprising an invariable orifice in the discharge from each turbomachine maintaining the ratio of the fluid flowing through the turbomachines constant.

3. A gas pressure operated motor having a substantially constant speed over an appreciable range of power output comprising, in combination, a gas turbine adapted to convert gas pressure energy into mechanical energy, a gas compressor adapted to convert mechanical energy into gas pressure energy, means connecting the turbine to drive the compressor, a power absorbing useful work device driven by the turbine and having an energy demand relatively low compared to the compressor, the compressor being adapted to absorb the major part of the energy output of the turbine at a speed of the turbine affording the maximum energy output of the turbine, a common source of gas under substantial pressure connected to supply gas directly to the inlets of both the turbine and the compressor, means to exhaust the turbine through an outlet of fixed resistance to flow to a low pressure level substantially below that of the source and means to exhaust the compressor through an outlet of fixed resistance to flow to a pressure level substantially below the pressure level normally developed by the compressor so that ratio of the flow through the turbine to that through the compressor is not significantly affected by variations in the said pressure levels.

4. A gas pressure operated motor having a substantially constant speed over an appreciable range of power output comprising, in combination, a gas turbine adapted to convert gas pressure energy into mechanical energy, a gas compressor adapted to convert mechanical energy into gas pressure energy, means connecting the turbine to drive the compressor, a power absorbing useful work device driven by the turbine and having an energy demand relatively low compared to the compressor, the compressor being adapted to absorb the major part of the energy output of the turbine at a speed of the turbine affording the maximum energy output of the turbine, a common source of gas under substantial pressure connected to supply gas directly to the inlets of both the turbine and the compressor, means to exhaust the turbine to a low pressure level substantially below that of the source, and means to exhaust the compressor to a pressure level substantially below the pressure level normally developed by the compressor, the two said exhausting means comprising a choked orifice in the discharge from the turbine and a choked orifice in the discharge from the compressor, the said choked orifices isolating the turbine and compressor from the effect of variations in the pressures to which they exhaust.

5. A self governing power plant comprising a gas turbine, a rotary gas compressor, shaft means connecting the turbine to the compressor to drive the same, a gas inlet common to the turbine and compressor and adapted to receive gas at a high pressure level, a gas outlet for the turbine including a choked orifice adapted to discharge the gas to a low pressure level, a gas outlet for the compressor including a choked orifice adapted to discharge the gas to a low pressure level, an accessory device, and shaft means connecting the accessory device to the turbine and compressor so that the accessory device is driven thereby, said accessory device being adapted to impart a variable load on the turbine and compressor, the power output rating of the turbine being greatly in excess of the power demand rating of the accessory device.

References Cited by the Examiner

UNITED STATES PATENTS

| 1,156,549 | 10/15 | Perry | 253—59 |
| 1,170,547 | 2/16 | Kennedy | 253—59 |
| 2,503,250 | 4/50 | Eckert | 60—39.18 |
| 2,612,020 | 9/52 | Griffith | 60—39.18 |
| 3,073,114 | 1/63 | Wood | 253—55 |

FOREIGN PATENTS

| 200,731 | 3/55 | Australia. |
| 398,932 | 4/09 | France. |

SAMUEL LEVINE, *Primary Examiner.*